(12) United States Patent
Mahashin et al.

(10) Patent No.: US 7,574,580 B2
(45) Date of Patent: Aug. 11, 2009

(54) INTELLIGENT CACHING SCHEME FOR STREAMING FILE SYSTEMS

(75) Inventors: Daniel Mahashin, Sunnyvale, CA (US); Matthieu Jeanson, Sunnyvale, CA (US); John Su, Santa Clara, CA (US); Jeremy Alves, Mountain View, CA (US)

(73) Assignee: Magnum Semiconductor, Inc., Milpitas, CA (US)

( * ) Notice: Subject to any disclaimer, the term of this patent is extended or adjusted under 35 U.S.C. 154(b) by 782 days.

(21) Appl. No.: 11/089,459

(22) Filed: Mar. 25, 2005

(65) Prior Publication Data

US 2006/0008257 A1    Jan. 12, 2006

Related U.S. Application Data

(60) Provisional application No. 60/585,072, filed on Jul. 6, 2004.

(51) Int. Cl.
*G06F 12/00* (2006.01)
(52) U.S. Cl. ............. 711/221; 711/100; 711/200; 386/46; 386/124
(58) Field of Classification Search .......... 386/46, 386/124–126; 714/5; 711/115, 156, 100, 711/200, 221
See application file for complete search history.

(56) References Cited

U.S. PATENT DOCUMENTS

| | | | |
|---|---|---|---|
| 6,195,217 B1 | 2/2001 | Park | 360/48 |
| 6,233,389 B1 | 5/2001 | Barton et al. | 386/46 |
| 2003/0217226 A1* | 11/2003 | Makita | 711/115 |
| 2004/0153720 A1* | 8/2004 | Lee | 714/5 |
| 2004/0190856 A1* | 9/2004 | Kim et al. | 386/46 |

* cited by examiner

*Primary Examiner*—Thai Tran
*Assistant Examiner*—Mishawn Dunn
(74) *Attorney, Agent, or Firm*—Robert Platt Bell (57) ABSTRACT

A Hard Disk Drive (HDD) is provided two FATs and two cluster sizes, a regular cluster and a "Supercluster". In one example, each Supercluster is the size of four regular clusters. A second Supercluster FAT is added (FAT2) which works in a similar manner to the original FAT (hereinafter FAT1), but instead points to the next Supercluster in the chain. Since there are far fewer Superclusters than clusters, the Supercluster FAT (FAT2) can be stored in a cache memory. When data is streamed to and from the hard drive, it can be streamed to Superclusters and no seeks on the HDD to a FAT are required, as the FAT2 is cached in memory. Access time to and from the hard drive is decreased. The original cluster configuration is still supported. During lulls in system operation, the FAT2 data may be written to the drive and moreover, FAT1 data created and "flushed" to the hard drive. Thus, if the HDD is read by a standard computer system, it will recognize the regular clusters from the FAT1 table in a transparent manner (and ignore the FAT2 table).

18 Claims, 8 Drawing Sheets

| FAT | 0 | 1 | 2 | 3 | 4 | 5 | 6 | 7 |

Figure 1
(Prior Art)

| FAT: | * | 2 | 5 | * | * | 7 | * | X |
|---|---|---|---|---|---|---|---|---|
| CLUSTER: | 0 | 1 | 2 | 3 | 4 | 5 | 6 | 7 |

Figure 2
(Prior Art)

| FAT: | * | 2 | 5 | * | * | 7 | * | 1 |
|---|---|---|---|---|---|---|---|---|
| CLUSTER: | 0 | 1 | 2 | 3 | 4 | 5 | 6 | 7 |

(Prior Art)

(Prior Art)

INTELLIGENT CACHING SCHEME FOR STREAMING FILE SYSTEMS

CROSS REFERENCE TO RELATED APPLICATIONS

The present application claims priority from Provisional U.S. Patent Application No. 60/585,072 filed on Jul. 6, 2004, and incorporated herein by reference.

FIELD OF THE INVENTION

The present invention relates to hard disk drives (HDDs). In particular, the present invention is directed toward an improved File Allocation Table (FAT) scheme.

BACKGROUND OF THE INVENTION

Hard disk drives (HDD) have been used in the television arts to capture and store television programming for time shifting and other uses. Such devices, marketed under a number of names (e.g., TIVO® or the like) allow a user to record programming for later viewing, "rewind" a program being watched in real-time, and fast-forward over commercials and other unwanted segments.

Figure 6:
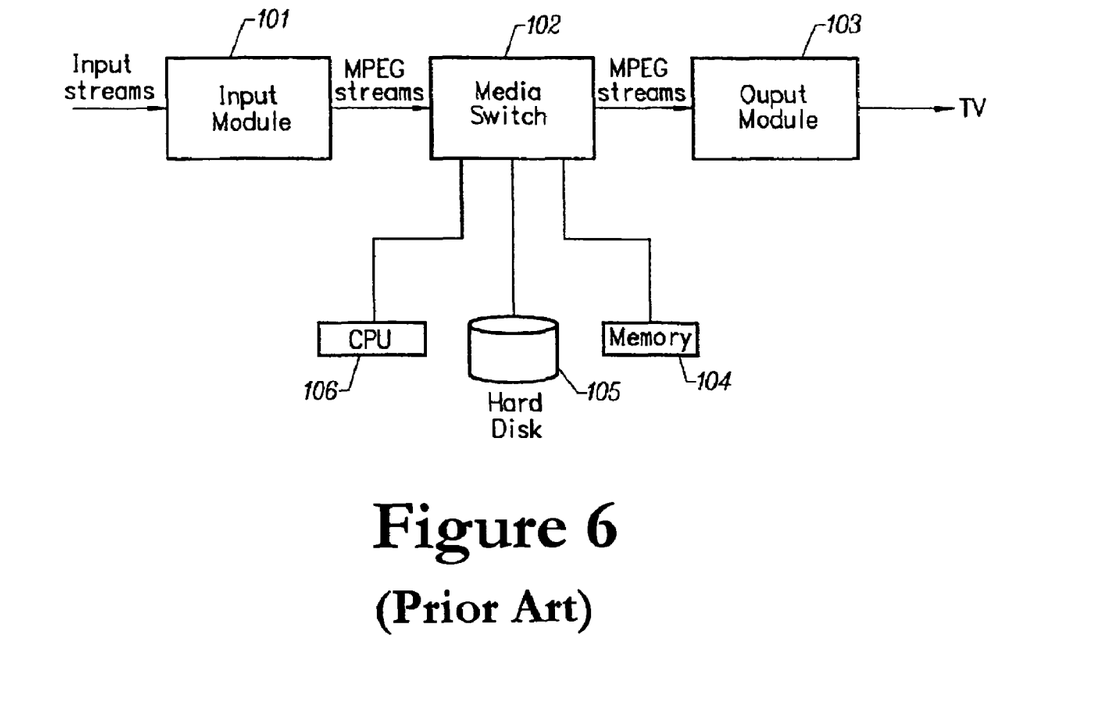
FIG. 6 is a block diagram illustrating the major components of a Prior Art system for storing video data on an HDD.

FIG. 6 is a block diagram illustrating the major components of a Prior Art system for storing video data on an HDD. An example of such a system can be found in U.S. Pat. No. 6,233,389, issued to Barton et al., on May 15, 2001 and incorporated herein by reference. In FIG. 6, the video storage system has an Input Module 101, Media Switch 102, and an Output Module 103. Input Module 101 takes television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG2 Transport. MPEG2 Transport is a standard for formatting the digital data stream from the TV source transmitter so that a TV receiver can disassemble the input stream to find programs in the multiplexed signal.

Input Module 101 produces MPEG streams. An MPEG transport multiplex supports multiple programs in the same broadcast channel, with multiple video and audio feeds and private data. Input Module 101 tunes the channel to a particular program, extracts a specific MPEG program out of it, and feeds it to the rest of the system. Analog TV signals are encoded into a similar MPEG format using separate video and audio encoders.

Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the Federal Communications Commission (FCC) mandates the use of line 21 for Closed Caption (CC) and Extended Data Services (EDS). Such signals are decoded by the input module 101 and passed to the other sections as if they were delivered via an MPEG2 private data channel.

Media Switch 102 mediates between a microprocessor CPU 106, hard disk or storage device 105, and memory 104. Input streams are converted to an MPEG stream and sent to Media Switch 102. Media Switch 102 buffers the MPEG stream into memory. Media Switch 102 then performs two operations if the user is watching real time TV: the stream is sent to the Output Module 103 and is written simultaneously to the hard disk or storage device 105. In some combined DVD/hard drive systems and other systems such as TiVo® and the like, all MPEG streams to be played may be retrieved from the HDD, even those received in "real time". Thus all paths for playback must first go through the HDD—which makes an efficient file system structure all the more critical.

Output Module 103 takes MPEG streams as input and produces an analog TV signal according to the NTSC, PAL, or other required TV standards. Output Module 103 contains an MPEG decoder, On-Screen Display (OSD) generator, analog TV encoder and audio logic. The OSD generator allows the program logic to supply images, which will be overlaid on top of the resulting analog TV signal. Additionally, the Output Module 103 can modulate information supplied by the program logic onto the VBI of the output signal in a number of standard formats, including NABTS, CC and EDS.

In addition to dedicated devices for storing television programming on a hard drive, many other television appliances are incorporating HDD storage to provide these time-shifting and other features. For example, a Digital Versatile Disk (DVD) player/recorder may be provided with an internal HDD to store television programming for later recording to a DVD. As some DVD disks can only be recorded or "burned" once, it is useful to have the data to be recorded stored and formatted for the burning process. An internal HDD provides this storage feature, allowing the user to edit the program prior to recording to a DVD.

In a personal computer (PC) system where a high-speed bus is provided along with a powerful and fast processor, streaming video data to a hard drive may not present too many difficulties. However, in a consumer product environment, such as the aforementioned DVD player/recorder, where a HDD is "embedded" in the device, such resources might not be available. The local bus may be much slower than on a PC, and extensive memory resources for buffering and caching may not be available. The challenge is to allow for streaming of data to and from the HDD without interruption.

Figure 1:
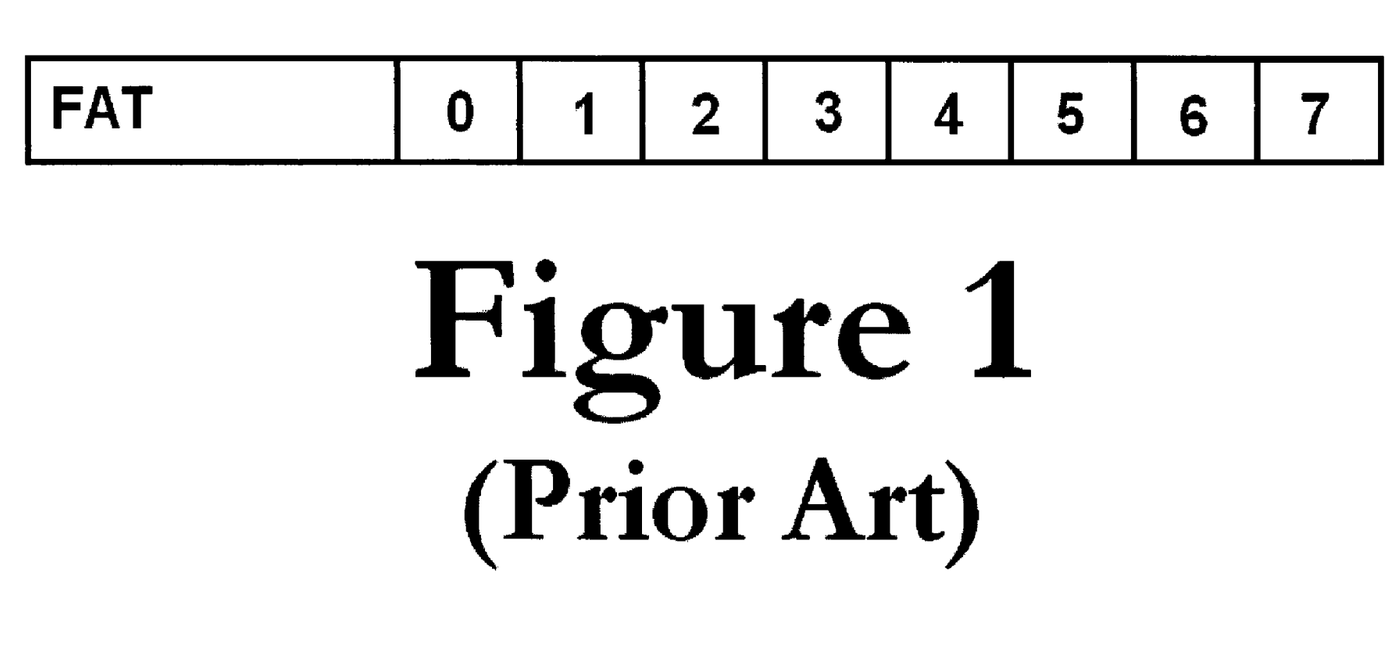
FIG. 1 is a diagram illustrating the arrangement of clusters and a File Allocation Table (FAT) on an HDD in the Prior Art.

Traditional Hard Disc Drives (HDD) have a file system which uses an addressing scheme whereby the HDD is partitioned into clusters, which in turn are addressed by a file allocation table (FAT). A simplified example of such a scheme is illustrated in FIG. 1. In this diagram, there are eight clusters of data, labeled 0 through 8, and a File Allocation Table (FAT), which defines the location of data in each cluster. The diagram of FIG. 1 is a highly simplified rendition of how data is stored on a disc. In this example, the first portion of the disc comprises the FAT, followed by a number of consecutive clusters of data. Other numbers of clusters would likely be used. The simplified example of FIG. 1 is for purposes of illustration only.

Figure 2:
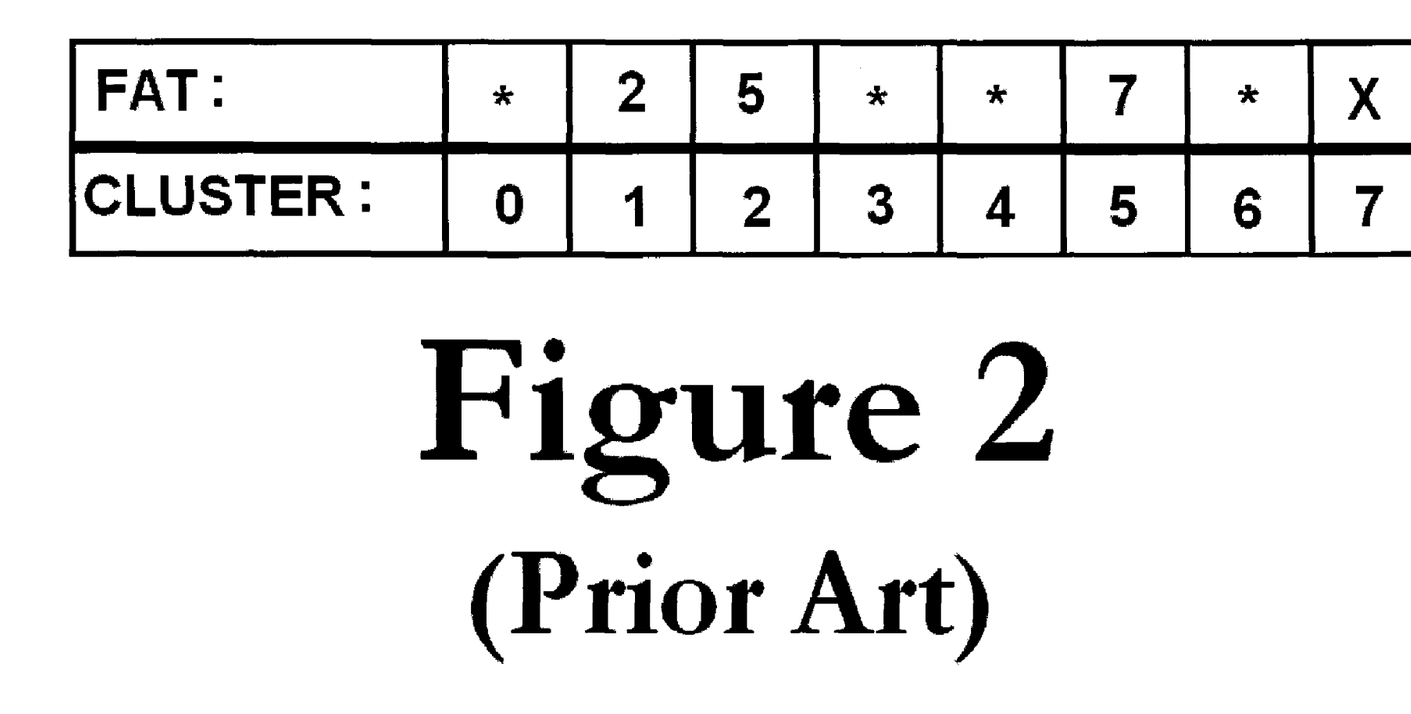
FIG. 2 is a diagram illustrating the relationship between a File Allocation Table and the clusters in the HDD in the Prior Art.

The FAT of FIG. 1 merely points to the location of data for the next cluster in a string of data. Thus, for example, if a file occupies clusters 1, 2, 5, and 7, the FAT will look as illustrated in FIG. 2, where each entry in the FAT holds a value that points to the next cluster. The diagram of FIG. 2 compares the contents of the FAT to the clusters on the disc. Thus, if the file is read starting at cluster 1, when it reaches the end of cluster 1, the system will look to the FAT for instructions on where to read next. For the table entry for cluster 1, we see the number 2, indicating that the next cluster read should be cluster number 2.

The system then reads cluster number 2, and when finished, looks to the FAT to see the location of the next cluster, which in this example is cluster number 5. After cluster 5 is read, the FAT points to cluster number 7. Cluster number 7 is the last cluster in this file, and thus the FAT indicated that no further clusters are to be read for this file, as indicated by the X in FIG. 2. For clusters not used for this file, no data is in the FAT, as indicated by the * in FIG. 2. Note this diagram is highly schematic and simplified for the purposes of illustration.

Figure 3:
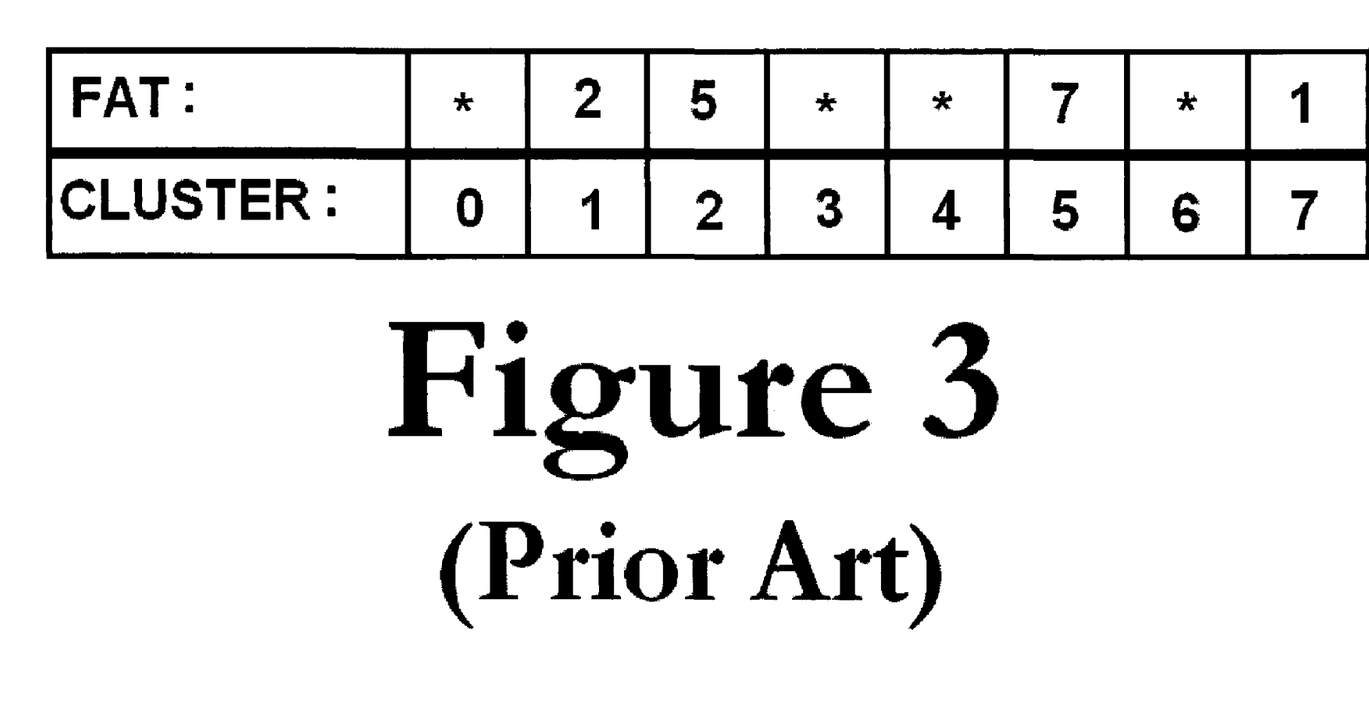
FIG. 3 is a diagram illustrating the relationship between a File Allocation Table and the clusters in a circular buffer in an HDD in the Prior Art.

FIG. 3 is a diagram illustrating the relationship between a File Allocation Table and the clusters in a circular buffer in an HDD in the Prior Art. FIG. 3 illustrates the same relationship between clusters and FAT, except that the file in this instance is a circular buffer, and thus does not have an end point per se. Rather than the last cluster 7 in the file being written to or read, the FAT then points back to the first cluster in the file, namely cluster 1 in this example. As such, data may be continually read from or written to the file. When the nominal end of the file is reached, processing passes back to the beginning. For a write sequence (e.g., storing streaming video data), data is overwritten once the end of the buffer is reached.

The problem with using the FAT scheme of FIGS. 2 and 3 for streaming video data is that the clusters are too small for practical use. With small clusters and large video files, the FAT quickly becomes very large and cannot be easily cached. Thus, a number of random head seeks are required for the HDD to read the FAT, to jump to the next cluster, and then to read or store data.

Of course, one solution is to increase cluster size. Using a larger cluster size may work for storing streaming data and other large files. However, if smaller files are to be stored on the HDD, such as JPEG image files or MP3 files, the use of large clusters wastes a lot of storage space on the HDD, as huge clusters are being used to store tiny files.

Figure 4:
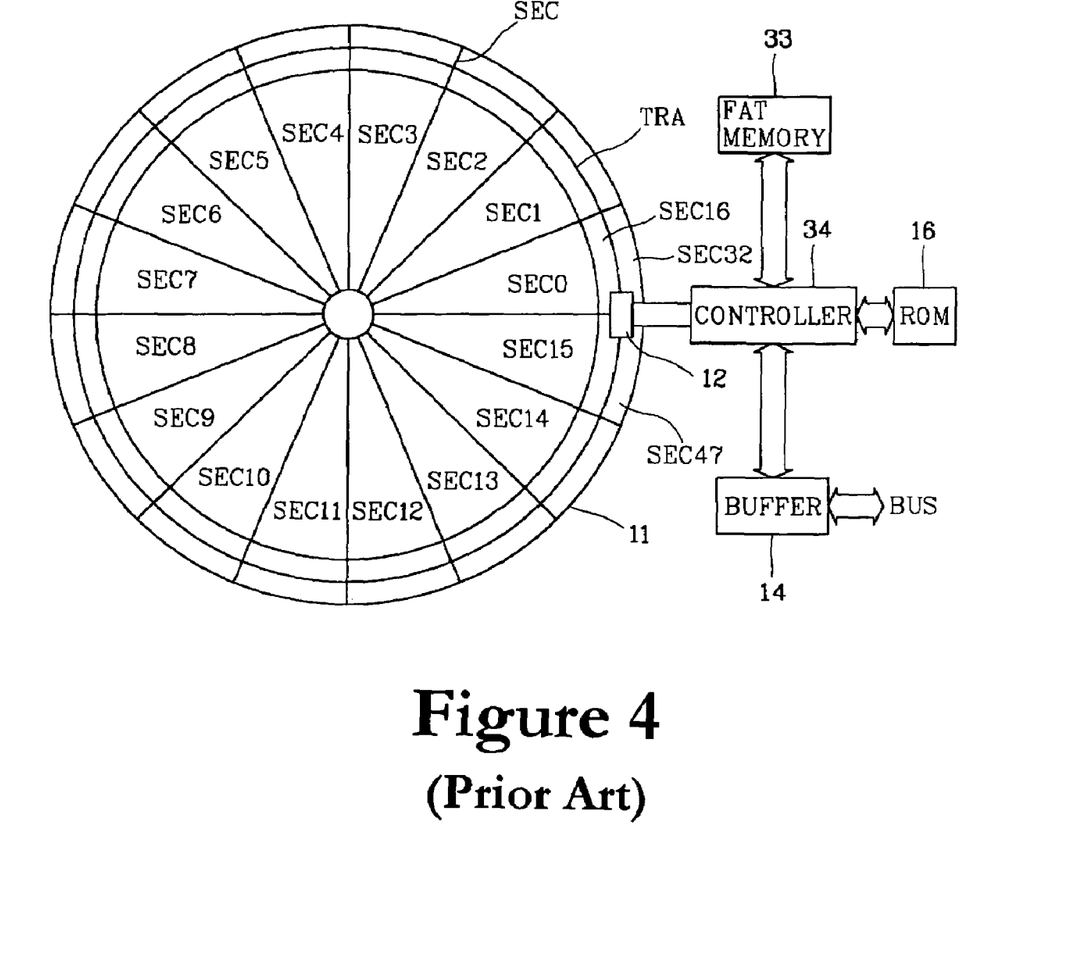
FIG. 4 is a diagram illustrating a Prior Art HDD with a memory for storing FAT information.

Another approach would be to use a non-volatile memory for the FAT instead of storing FAT data on the disk or to caching FAT data in a volatile memory for later recordation to the disk. FIG. 4 illustrates a HDD equipped with a FAT memory as illustrated in U.S. Pat. No. 6,195,217 to Park (hereinafter "Park"), issued Feb. 27, 2001, and incorporated herein by reference. The HDD of Park includes a head 32 for recording data on the hard disk 31 having a plurality of sectors SEC0 through SEC47, which are separated by sector separation lines SEC and tracks TRA for reading data from the same. A FAT memory 33 stores FAT information. A controller 34 controls the movement of the head 32 and the rotation of the hard disk 31, and the input/output of data. The data inputted to and outputted from the controller 34 and data bus, BUS, are buffered by buffer 35. A ROM 36 stores the disk drive information such as the number of cylinders, heads and sectors per track or the zone tables.

The plurality of the sectors SEC0 through SEC47 may include a boot region, a root director region, and a data region, in order. In Park, the sectors do not include a FAT region. Unlike a conventional hard disk, hard disk 31 of Park does not include the FAT region, and the FAT information is stored in FAT memory 33, which is a nonvolatile memory device. As can be appreciated, FAT memory 33 can be one of a static random access memory (SRAM) with a battery, a random access memory (RAM) with a battery or a flash memory.

Externally supplied data is written in the hard disk 31, and the written data is read. The controller 34 moves the head 32 of the hard disk 31, and a desired sector of the hard disk 31 is searched. That is, the following processes are performed. The controller 34 scans the address of a start cluster from the root director region by controlling head 32, and recognizes the location of the start cluster. Controller 34 fixes the head 32 and reads the FAT information stored in the FAT memory 33. At this time, the speed for recognizing the entire cluster addresses is about 50 times faster than the conventional FAT access time. Controller 34 moves the head 32 to the data region and reads and writes data.

As described in Park, the HDD equipped with a FAT memory is directed to writing data in the FAT memory 33, thus reducing the number of HDD accesses, so that the entire HDD access time can be reduced. In addition, since the FAT information is not stored in the hard disk, the HDD storing capacity can be increased By using a FAT memory, Park eliminates the need to randomly seek the HDD for retrieving FAT data. However, one disadvantage of the system of Park is that with small cluster sizes, a large amount of non-volatile memory is required to store the FAT, which would increase cost of the design. In addition, while access times to a non-volatile memory may be faster than a random-head seek on the disk, they may be slower than access times to a volatile memory in a FAT cache. For streaming video data, a fast response time may be needed from the FAT. Thus, a need exists in the art for a FAT system which can handle both large video files as well as smaller data files, without substantially increasing the size of the FAT, adding additional HDD hardware, and also be compatible with existing file systems.

SUMMARY OF THE INVENTION

The present invention implements a scheme for a high speed file system which may be used to robustly and simultaneously read and write high bit-rate video data in an embedded environment with limited resources.

The present invention provides a unique way of addressing an HDD, which allows for faster reads and writes to the drive in a manner that is still backward compatible with prior operating systems. In addition, this new drive addressing technique allows for additional features to be implemented into the system to increase the versatility and functionality of a HDD TV time-shifting device.

In the present invention, the HDD is provided two FATs and two cluster sizes, a regular cluster and a "Supercluster". In one example, each Supercluster is the size of four regular clusters. However, in the present invention, a Supercluster can be of any reasonable size, provided that each Supercluster is comprised of n regular clusters, where n is an integer greater than one. A second Supercluster FAT is added (FAT2) which works in a similar manner to the original FAT (hereinafter FAT1), but instead points to the next Supercluster in the chain. Since there are far fewer Superclusters than clusters, the Supercluster FAT (FAT2) can be stored in a cache memory. When data is streamed to and from the hard drive, it can be streamed to Superclusters and no seeks on the HDD to a FAT are required, as the FAT2 is cached in memory. Access time to and from the hard drive is decreased.

Despite this new HDD Supercluster architecture, the original cluster configuration is still supported, and thus the system is backward compatible. During lulls in system operation, the FAT2 data may be written to the drive and moreover, FAT1 data created and "flushed" to the hard drive. Thus, if the HDD is read by a standard computer system, it will recognize the regular clusters from the FAT1 table in a transparent manner (and ignore the FAT2 table).

It can be appreciated that this invention could have applications extending beyond consumer electronics. The use of the Superclusters allows for other features to be implemented as well. For example, in a Prior Art TIVO® system, a fixed size circular buffer is used to store the last x minutes (e.g., 30-60) of television programming such that the user can pause, repeat, and fast-forward through a TV program. However, this fixed buffer may not take full advantage of the available space on the hard drive.

The hard drive may have a number of programs stored on it, or it may be empty. In the Prior Art, a fixed buffer size was used, regardless of the available space on the hard drive. Using Superclusters, all the available space on the hard drive can be used as a circular buffer for storing TV data. As data is streamed onto the hard drive, the cached FAT2 is updated to show the location of that data. However, if a power interruption occurs or the device is turned off, the FAT2 data may be lost.

Losing this FAT2 data may not be harmful, and may in fact be advantageous, as the circular buffer FAT2 data is never recorded to the hard drive, and thus is not "flushed" to the FAT1. While the underlying Supercluster data may be present on the HDD disk, the FAT1 and FAT2 will show the space as being empty. Thus, when the consumer re-boots the system, the drive will show available space and an empty circular buffer.

If this were not the case, the drive would always show itself as being completely filled, and unless a utility were provided for the consumer to erase the circular buffer, no new programs could be stored. Thus, the Supercluster system allows all available blank space in the hard drive to be used for caching TV programs without locking up the hard drive space.

Another aspect of this invention is the configurable priority scheduling for the various operations on the drive. For video data streaming, the top priorities may be insuring that the write cache never overflows and the read cache never empties. If both caches are respectively below and above certain set points, other operations, such as cache flushing may take place. In this manner, the operation of the system is optimized to insure that minimum performance standards are met without resorting to using hardware with unnecessary high performance levels.

There are thus numerous points of novelty in the present invention: the broad idea of Superclustering, cache flushing, priority scheduling, and the dynamic circular data cache. The various aspects of the present invention, although disclosed in terms of a consumer HDD TV storage device, have applications beyond consumer products, including, but not limited to Personal Computers (PC) or the handheld environment.

There are several requirements that are specific to streaming read and write of video data. The time it takes for read operations must be guaranteed to have an upper bound to ensure smooth video presentation. The time it takes for write operations must be guaranteed to have an upper bound to ensure that recording buffers do not overflow. If at any point a writing stream is interrupted, the file system needs to preserve its consistency along with as much of the written stream as possible. The file system must be user configurable in its behavior to satisfy both of these properties, as different embedded environments will have different timing behaviors. In the case where read and write operations are done on the same file, the file system needs to keep track of the read and write pointer to make sure that the read pointer never overtakes the write pointer. The file system can create a circular file of infinite length as long as there is some free space in the HDD. A circular file (buffer) may need to be used for time-shifting operations in a HDD TV application.

DETAILED DESCRIPTION OF THE INVENTION

Figure 5:
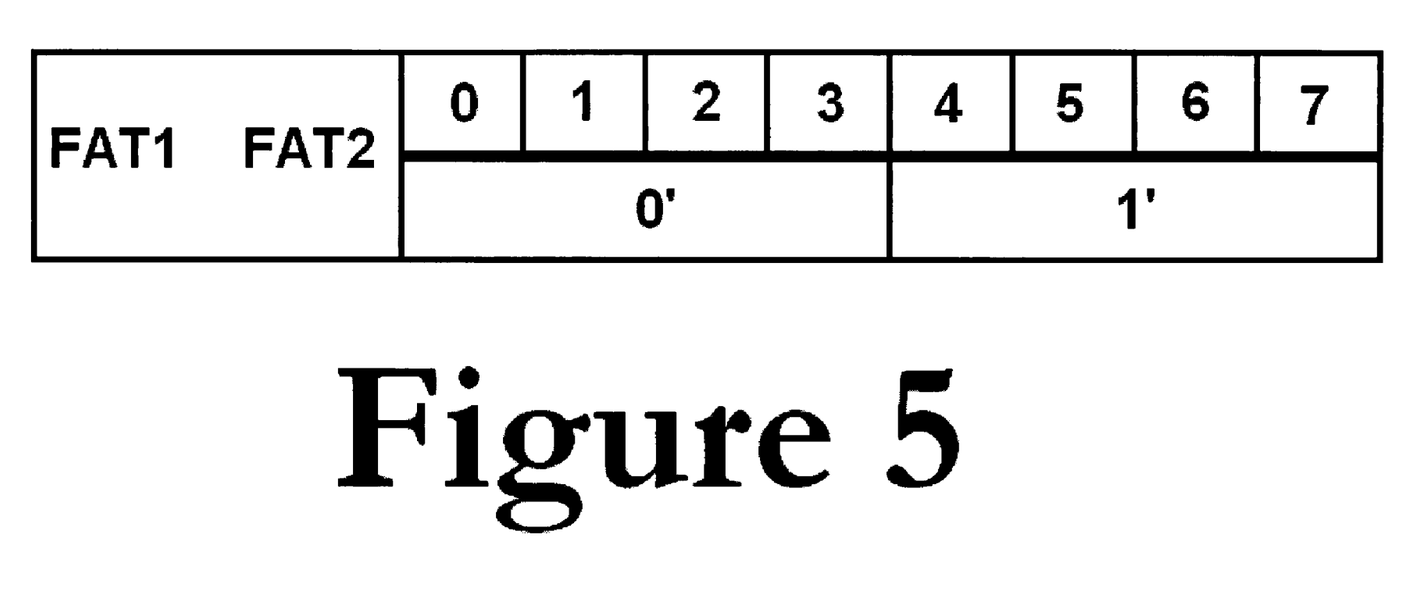
FIG. 5 is a diagram illustrating the relationship between clusters, Superclusters and the FAT1 and FAT2 tables on the HDD.

FIG. 5 is a diagram illustrating the relationship between clusters, Superclusters and the FAT1 and FAT2 tables on the HDD. As in FIG. 1, the clusters in this example as illustrated as clusters 0-7. The highly simplified drawing of FIG. 5 is for purposes of illustration only and does not represent the actual number of clusters on a disk. In the example of FIG. 5, each Supercluster is the size of four regular clusters. Other numbers of clusters per Supercluster may be used without departing from the spirit and scope of the present invention. Superclusters 0' and 1' are shown concurrent with clusters 0-3 and 4-7, respectively. Thus, data may be written to the same portions of the HDD, which may be concurrently formatted as clusters and Superclusters. The nature of the data to be written (e.g., small JPEG files versus streaming video) may determine whether data is written as clusters or Superclusters.

In addition to the traditional FAT, shown here as FAT1, a second Supercluster FAT is added (FAT2) which works in a similar manner to the original FAT1, but instead points to the next Supercluster (0',1') in the chain. Again, the number of clusters and Superclusters shown here is simplified for the purposes of illustration. In application, the number of clusters and/or Superclusters could run into the hundreds and thousands. Since there are far fewer Superclusters than clusters, the Supercluster FAT (FAT2) can be stored in a cache memory of the HDD. When data is streamed to and from the hard drive, it can be streamed to Superclusters and no seeks to the FAT2 on the HDD are required, as the FAT2 is cached in memory. Access time to and from the hard drive is thus decreased.

Yet, the original cluster configuration is still supported. During lulls in system operation, the FAT2 data may be written to the drive and moreover, FAT1 data created and "flushed" (i.e., written to the FAT2 section of the hard drive from the cache) to the hard drive. Thus, if the HDD is read by a standard computer system, it will recognize the clusters in a transparent manner (and ignore the FAT2 table).

A HDD of a particular size has the smallest access granularity of a sector, which may comprise 512 bytes. A file system usually creates an aggregate of these sectors and uses that as the smallest continuous units of data for a file. The aggregate of sectors may be defined as a cluster. Cluster size is usually determined depending on the type of data to be stored. If the files have a small average size, then a cluster size that is too large would incur a lot of overhead. On the other hand, a cluster size that is too small will cause its own inefficiency since the cluster table would be larger and the file system would need to constantly access it to navigate the file.

In the implementation of an HDD in a consumer product for storing and playing back television (video), pictures (JPEGs and the like) and music (e.g., MP3 and the like), there is a mix of very large video files which are usually in the order of hundreds of megabytes to gigabytes along with some very small files for still pictures and music, which could be as small as several hundred kilobytes. If the cluster size is small, the file system overhead in accessing the cluster tables will make the performance unacceptable. The question then is how to combine the two properties together into a single file system. The solution of the present invention is to create a two level hierarchical cluster structure. At the lowest level, the cluster size is small enough to accommodate small files. At the second level, an aggregate of the first level clusters are created with its own cluster tables.

The second level cluster is the Supercluster. Thus, a particular sector in the file system belongs to two different clusters at the same time. During allocation time, a decision is made on whether to allocate a cluster or a Supercluster. If a Super cluster is allocated, all first level clusters that it contains are no longer allocable as first level clusters. Other than that restriction, cluster and Superclusters can be interleaved in the HDD, maximizing the space usage. Each hierarchy will have its own cluster table, which will be navigated depending on the file type.

There are at least three advantages to this scheme. First, the file system can have the beneficial properties of large and small clusters at the same time. Second, since they are interleaved, usage of the HDD space can be maximized. Third, backward compatibility with the original cluster based file system scheme is preserved. Since the second level of clusters does not interfere with the first level, the original file system scheme is still valid. Backward-compatibility is valuable for potential interoperability with existing file systems and for debugging purposes since the HDD can be directly readable by a PC.

Since the Supercluster FAT table is sufficiently small, a very large chunk of it (even 100%) can be stored in cache. If the entire cluster table is stored in memory, file system overhead is eliminated completely. Thus, the system has the benefit of navigating through files that are not physically continuous without incurring any additional expensive input/output (I/O) costs (e.g., time-consuming random seeks on the HDD).

It is not enough for any individual read or write operations to be fast, because at any one time there could potentially be multiple read and write operations pending. It is necessary to schedule the read and write operations in such a way that the maximum wait for any one operation is below a certain worst-case bound. Thus, it should be determined as to what granularity the interleaving should be. At the highest level, whole read and write operations could be interleaved at a time. At the lowest level, up to 512 byes chunks could be interleaved.

For flexibility, this functionality is implemented at the lowest level using the following scheme. The file system consists of two layers. The first supplies generic file system functionality that allows the user to navigate through files. The second layer exists under the first layer and acts as a programmable generic I/O scheduler. Its function is to receive requests for reads and writes, and based on certain parameters decide which one should be executed next. In this way, the behavior of the file system is easily adaptable to different circumstances where read and write have differing priorities.

In the case of system failures during recording, the file system needs to make its best efforts to retain as much of the recorded video as possible. Retaining as much of the recorded video may be crucial because of the liberal use of the cache as described above. The file system includes an additional component, which has the express purpose of monitoring streaming write operations and periodically updating all relevant file system structures. Any sudden failures will always leave a consistent state on the HDD and will retain up to the last few operations of write.

Another requirement for personal video recorder (PVR) application is for the user to be able to record and playback from a buffer for an indefinite period of time. The ability to record and playback for an indefinite period of time enables the platform to provide features such as pausing live television, instant replay, and the like. The file system of the present invention takes advantage of the two-level cluster hierarchies and the caching made possible by it. When a client a requests an infinite buffer to be created, a circularly linked set of super clusters are allocated from all free super clusters. The Allocation of a circularly linked set of Superclusters, unlike the one for a real file (i.e., a file comprised of standard clusters, defined by FAT1), however, is never flushed to the disk. In effect, the file system creates a virtual file, which automatically disappears when it is erased in cache or there is some kind of failure and the cache memory is lost.

There are several advantages to this type of infinite buffer. The circular buffer can take advantage of all free super clusters, which makes the system a lot more convenient compared to those with fixed size buffers. If the HDD is almost empty, the user should be able to utilize all the free space and rewind a farther distance from the live feed. The circular buffer does not need any cleanup or incur any risk of corrupting the file system if there is a sudden system failure because all of its data is in the cache and will never be written to the disk.

Figure 7:
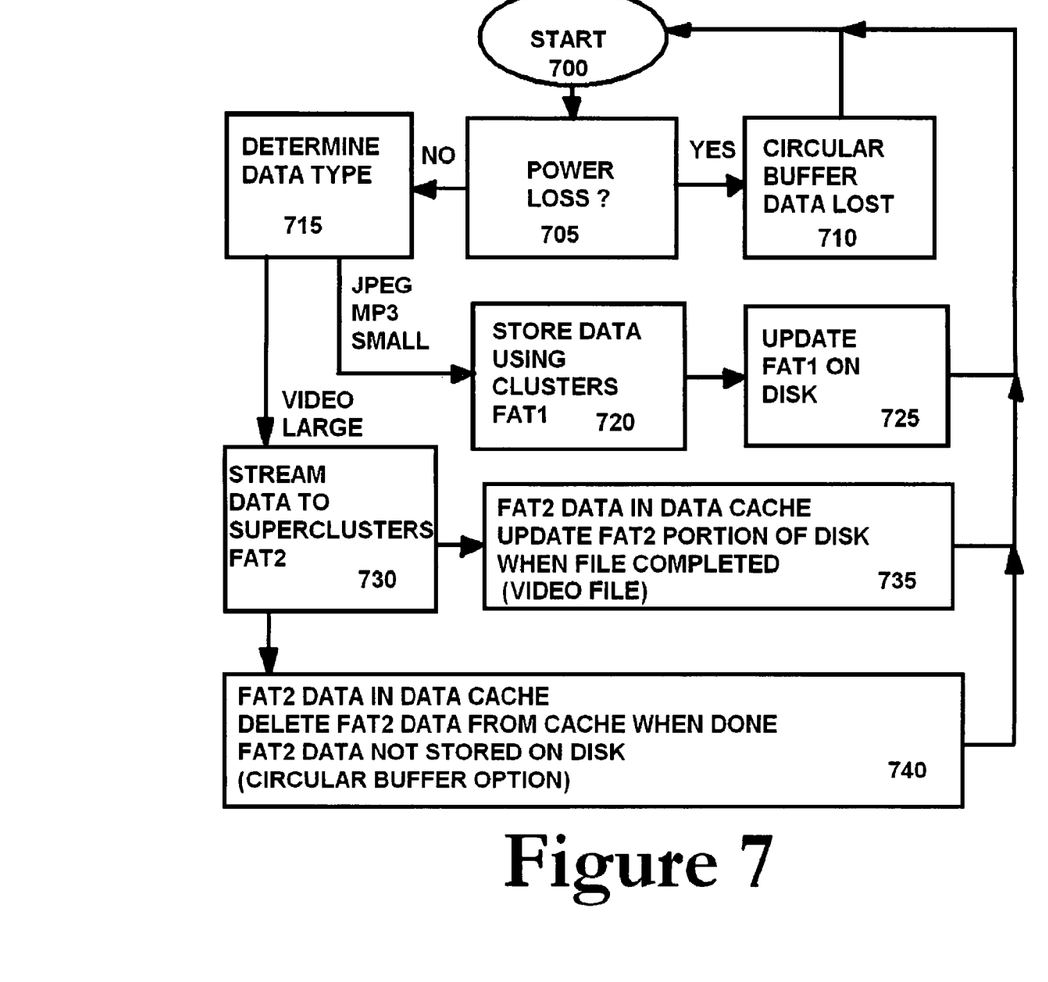
FIG. 7 is a flowchart illustrating the process of storing data using the dual FAT of the present invention.

FIG. 7 is a flowchart illustrating the process of storing data using the dual FAT of the present invention. In FIG. 7, the process starts in step 700. If a power loss occurs as indicated in step 705, any circular buffer data is lost, as the contents of the FAT2 cache are not updated to the disk, and processing returns to step 700. This loss of circular buffer data may actually be beneficial to the design. The circular buffer may comprise the entire contents of the disk that are not already written to (for which Superclusters are available). If this file were permanently recorded, on the next power-up the disk would show as full. Since the circular buffer is mostly used for storing video data for the last x minutes or hours for rewind and review purposes, the loss of such data may not be critical. If a user wishes to save certain programs or video portions, these can be marked out of the circular buffer and the corresponding FAT2 data stored on the disk.

In step 715, a determination is made as to the data type, based upon the file type, file size, or other known criteria. For smaller files such a image files (e.g., JPEG) or music files (e.g., MP3), data may be traditionally stored on the disk using standard Prior Art clusters, with the cluster information stored on the disk in a traditional FAT1 table. The present invention is described in the context of a consumer video device. However, other file types may be used in other applications without departing from the spirit and scope of the present invention. When the small file has been stored as set forth in step 720, the FAT1 table is then updated with cluster data in step 725. Steps 720 and 725 are shown as separate, sequential steps. However, in practice, both steps may take place concurrently using random head seeks on the HDD. Such head seeks (back and forth from the FAT1 table to the data clusters) do increase access time, and thus are not suitable for video data streaming and other high-volume data applications.

If a large video (e.g., MPEG file) or other large data file is to be stored on the disk, the data from such files may then be streamed to the disk and stored as Superclusters as illustrated in step 730. FAT2 data for such Superclusters is stored in a cache memory, and thus no random seeks are required on the HDD to record such data. For this scenario, two data storage conditions may be present. If a user is storing a video or other large file for later access and use, processing may pass to step 735. In this process, the FAT2 Supercluster information data is updated in the data cache, while the video or other data is streamed to the disk in Superclusters. Once the video data has been recorded, the FAT2 data may then be updated ("flushed") to the HDD, thus forming a complete file record for later access.

While such a video file may not be backward compatible with Prior Art file access systems, the presence of such files will not disrupt the reading of other ordinary cluster-based files. As previously illustrated, a traditional FAT may comprise a series of pointers pointing to the next cluster in a file, with an end of file indicator where the file ends. Thus, clusters allocated as part of Superclusters simply will not appear in the traditional FAT (FAT1), which will view the FAT2 Superclusters as being blank or unwritten cluster segments. To prevent unauthorized overwriting of such segments, the FAT1 table may be written with data to indicate such clusters are unavailable for writing.

In a second scenario, a circular buffer may be established on the disk for the purpose of buffering video data, as set forth in step 740. In this step, as in step 735, video data may be streamed to the disk in Superclusters, and FAT2 data stored in a FAT2 data cache. Again, since random access HDD seeks are not required to read, write, and update the FAT2, the data can stream directly to the disk. However in this step, FAT2 data may not be written to the disk as a matter of choice. When the system is shut off, or the circular buffer is no longer desired, the FAT2 data may be erased, disregarded, or simply disappear from volatile memory in the FAT2 buffer. Without the File Allocation Table intact for the Superclusters in the circular buffer, the HDD cannot read the circular buffer file. Although the actual data may be present on the disk, since the FAT2 data for this file is not saved, it is as though the data was never there.

Again, this may be a useful feature, as for circular buffering, permanent or long-term storage of data may not be required. Moreover, the circular buffer continually overwrites itself anyway, such that only the last x minutes or hours of video data are stored. When restarted or re-powered, the circular buffer may be re-defined and new data stored.

Figure 8:
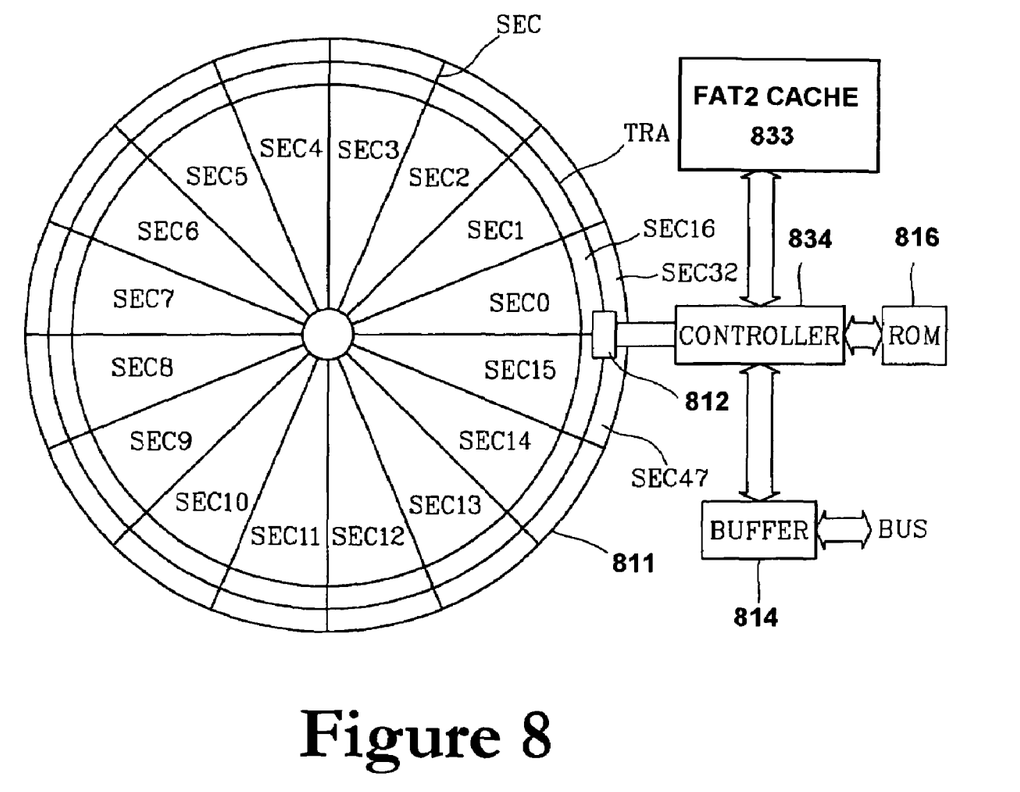
FIG. 8 is a block diagram illustrating the major components of the present invention.

FIG. 8 is a block diagram illustrating the major components of the present invention. The HDD of FIG. 8 includes a head 812 for recording data on the hard disk 811 having a plurality of sectors SEC0 through SEC47, which may by separated by sector separation lines SEC and tracks TRA for reading data from the same. A FAT cache 833 temporarily stores FAT2 information. Since the FAT2 data is for Superclusters only, such FAT2 data can be easily cached in a small memory. Traditional FAT1 data may continue to be stored on the hard disk 811 as in the Prior Art. Controller 834 controls the movement of the head 812 and the rotation of the hard disk 811, and the input/output of data. The data inputted to and outputted from the controller 834 and data bus, BUS, are buffered by buffer 814. A ROM 816 may store the disk drive information such as the number of cylinders, heads and sectors per track or the zone tables.

The plurality of the sectors SEC0 through SEC47 may include a boot region, a root director region, and a data region, in order. The sectors include a FAT region for storing FAT1 and FAT2 data as written from the FAT2 cache 833. When a file write is completed, FAT1 and FAT2 data may be written to the disk 811. FAT1 data may be read from and written directly to the disk 811. FAT2 data may be read from and written to FAT2 Cache 833, which then updates the FAT portion of disk 811 when the file access is complete, or when read/write time becomes available during data access.

While the preferred embodiment and various alternative embodiments of the invention have been disclosed and described in detail herein, it may be apparent to those skilled in the art that various changes in form and detail may be made therein without departing from the spirit and scope thereof.

For example, while the present invention is disclosed in the context of a HDD for use in a consumer video device, the present invention may also be applied to other applications of HDD devices, including but not limited to personal computers, laptops, and other computing devices, hand-held computer, audio players, cell phones, and other devices. In addition, although the present invention is disclosed in terms of a HDD system, it may be applied to other storage systems where a FAT or other allocation device is used to indicate the location of clusters or other file or data segments. Thus, the present invention may be applied to both hard disks and floppy disks, tape drives, CD-ROMs, audio CDs, DVDs, DVD-Rs, DVD-RWs, and other magnetic and optical media, as well as solid-state memory devices (flash memory and the like).

In addition, while the present invention is disclosed in terms of two cluster sizes (standard clusters and Superclusters), other numbers of sizes may be used. Thus, for example, extremely huge data files may use a Super-Supercluster to more efficiently store data. Smaller files may use a sub-cluster size. A plurality of cluster sizes may be provided for various data types and file sizes. A variable cluster size may be employed in an embodiment where every cluster is sized according to the data type and storage requirements, as well as remaining space on the disk and desired access time.

Moreover, although disclosed in the preferred embodiment as having two File Allocation Tables FAT1 and FAT2, the present invention may be employed with a single File Allocation Table for all cluster sizes, with additional cluster data stored in the File Allocation Table to indicate not only cluster data for each file, but cluster size data as well.

We claim:

1. A method of storing data on a hard drive, comprising:
   determining data storage size requirements for data to be stored on the hard drive,
   selecting a data cluster type from at least two data cluster types based upon data storage size requirements, the at least two data cluster types comprising standard clusters and superclusters, each of the superclusters comprising a number of standard clusters,
   storing data in at least one of selected data cluster type, and
   recording cluster file allocation data in one of a plurality of File Allocation Tables corresponding to the selected cluster type, the plurality of File Allocation Tables including a standard File Allocation Table for storing standard cluster file allocation data, and a supercluster File Allocation Table for storing supercluster file allocation data;
   wherein selecting a data cluster type from at least two data cluster types comprises selecting from standard clusters and superclusters, wherein the each of the superclusters comprises n standard clusters, where n is an integer greater than one; and
   wherein standard clusters within the superclusters are individually addressable on the hard drive from the standard File Allocation Table so as to allow the hard drive to be backwardly compatible with standard cluster addressing systems.

2. The method of claim 1, wherein determining data storage size requirements comprises determining file size of the data to be stored.

3. The method of claim 1, wherein determining data storage size requirements comprises determining file type of the data to be stored.

4. The method of claim 3, wherein determining file type of the data to be stored comprises determining if the file type is one of a an image file, an audio file, a video file, or a circular file buffer.

5. The method of claim 1, where recording cluster data in one of a plurality of File Allocation Tables corresponding to the selected cluster type comprises:
  recording standard cluster file allocation data to the standard File Allocation Table for data stored in standard clusters; and
  recording supercluster file allocation data to the supercluster File Allocation Table in a supercluster File Allocation Table cache for data stored in superclusters.

6. The method of claim 5, wherein:
  the standard File Allocation Table is located on the hard drive,
  the supercluster File Allocation Table is located in the File Allocation Table cache, and
  after recording supercluster file allocation data to the supercluster File Allocation Table in the supercluster File Allocation Table cache, the supercluster File Allocation Table data is selectively recorded to the hard drive from the supercluster File Allocation Table cache.

7. A hard drive for storing data, comprising:
  a data input for receiving data and determining data storage requirements for data to be stored on the hard drive,
  a controller for selecting a data cluster type from at least two data cluster types based upon data storage size requirements, the at least two data cluster types comprising standard clusters and superclusters, each of the superclusters comprising a number of standard clusters,
  a hard drive disc for storing data in at least one of a selected data cluster type, and
  a File Allocation Table recorder, for recording cluster data in one of a plurality of File Allocation Tables corresponding to the selected clusters type, the plurality of File Allocation Tables including a standard File Allocation Table for storing standard cluster file allocation data, and a supercluster File Allocation Table for storing supercluster file allocation data;
  wherein the controller selects a data cluster type from at least two data cluster types comprising standard clusters and superclusters, wherein the each of the superclusters comprises n standard clusters, where n is an integer greater than one; and
  wherein standard clusters within the superclusters are individually addressable on the hard drive from the standard File Allocation Table so as to allow the hard drive to be backwardly compatible with standard cluster addressing systems.

8. The apparatus of claim 7, wherein the data input determines file size of the data to be stored.

9. The apparatus of claim 7, wherein the data input determines the file type of the data to be stored.

10. The apparatus of claim 9, wherein the data input determines if the file type is one of a an image file, an audio file, a video file, or a circular file buffer.

11. The apparatus of claim 7, wherein the File Allocation Table recorder records standard cluster allocation data in the standard File Allocation Table for data stored in standard clusters and records supercluster file allocation data to the supercluster File Allocation Table in a supercluster File Allocation Table cache for data stored in superclusters.

12. The apparatus of claim 11, further comprising a supercluster File Allocation Table cache, wherein:
  the standard File Allocation Table is located on the hard drive,
  the supercluster File Allocation Table is located in the File Allocation Table cache, and
  after recording supercluster file allocation data to the supercluster File Allocation Table in the supercluster File Allocation Table cache, the supercluster File Allocation Table data is selectively recorded to the hard drive from the supercluster File Allocation Table cache.

13. A multimedia recording apparatus for storing multimedia data and other data, comprising:
  a controller for selecting a data cluster type from at least two data cluster types based upon data type, the at least two data cluster types comprising standard clusters and superclusters, each of the superclusters comprising a number of standard clusters,
  a hard drive disc for selectively storing multimedia data and other data in at least one of a selected data cluster type, and
  a File Allocation Table recorder, for recording cluster allocation data in one of a plurality of File Allocation Tables corresponding to the selected cluster type, the plurality of File Allocation Tables including a standard File Allocation Table for storing standard cluster allocation data, and a supercluster File Allocation Table for storing supercluster file allocation data;
  wherein the controller selects a data cluster type from at least two data cluster types comprising a standard clusters and superclusters, wherein the each of the superclusters comprises n standard clusters, where n is an integer greater than one; and
  wherein standard clusters within the superclusters are individually addressable on the hard drive from the standard File Allocation Table so as to allow the hard drive to be backwardly compatible with standard cluster addressing systems.

14. The multimedia recording apparatus of claim 13, wherein the controller determines if the data type is one of image data, an audio data, video data, a circular file buffer, or other data.

15. The multimedia recording apparatus of claim 13, wherein the File Allocation Table recorder records standard cluster allocation data in the standard File Allocation Table for data stored in standard clusters and records supercluster file allocation data to the supercluster File Allocation Table in a supercluster File Allocation Table cache for data stored in superclusters.

16. The multimedia recording apparatus of claim 15, further comprising a supercluster File Allocation Table cache, wherein:
  the standard File Allocation Table is located on the hard drive,
  the standard File Allocation Table is located in the File Allocation Table cache, and
  after recording supercluster file allocation data to the supercluster File Allocation Table in the supercluster File Allocation Table cache, the supercluster File Allocation Table data is selectively recorded to the hard drive from the supercluster File Allocation Table cache.

17. A Supercluster for storing data on a computer hard drive, each Supercluster comprising:
  a plurality of n standard data clusters on the computer hard drive, where n is an integer greater than one, wherein data is stored on the computer hard drive based upon data storage size requirements, where large data files are stored one or more Superclusters and small data files are stored in one or more standard clusters, wherein Supercluster location data for large data files is stored in a Supercluster File Allocation Table, and standard cluster location data for small data files is stored in a standard cluster File Allocation Table, and wherein standard clusters within the superclusters are individually addressable on the hard drive from the standard File Allocation Table so as to allow the hard drive to be backwardly compatible with standard cluster addressing systems.

18. The Supercluster of claim 17, wherein the standard cluster File Allocation Table is located on the computer hard drive, the Supercluster File Allocation Table is located in a File Allocation Table cache, and after recording Supercluster file allocation data to the Supercluster File Allocation Table in the File Allocation Table cache, the Supercluster File Allocation Table data is selectively recorded to the hard drive from the File Allocation Table cache.

* * * * *